US011563772B2

(12) United States Patent
Doron et al.

(10) Patent No.: US 11,563,772 B2
(45) Date of Patent: Jan. 24, 2023

(54) DETECTION AND MITIGATION DDOS ATTACKS PERFORMED OVER QUIC COMMUNICATION PROTOCOL

(71) Applicant: RADWARE, LTD., Tel Aviv (IL)

(72) Inventors: Ehud Doron, Moddi'in (IL); David Aviv, Tel Aviv (IL); Eyal Rundstein, Giv'atayim (IL); Lev Medvedovsky, Netanya (IL)

(73) Assignee: Radware, Ltd., Tel Aviv (IL)

( * ) Notice: Subject to any disclaimer, the term of this patent is extended or adjusted under 35 U.S.C. 154(b) by 346 days.

(21) Appl. No.: 16/731,441

(22) Filed: Dec. 31, 2019

(65) Prior Publication Data

US 2021/0099482 A1 Apr. 1, 2021

Related U.S. Application Data

(60) Provisional application No. 62/906,432, filed on Sep. 26, 2019.

(51) Int. Cl.
*H04L 9/40* (2022.01)
*H04L 43/062* (2022.01)
(Continued)

(52) U.S. Cl.
CPC ........ *H04L 63/1458* (2013.01); *H04L 43/062* (2013.01); *H04L 43/067* (2013.01);
(Continued)

(58) Field of Classification Search
CPC . H04L 63/1458; H04L 43/16; H04L 63/1425; H04L 63/20
See application file for complete search history.

(56) References Cited

U.S. PATENT DOCUMENTS 7,760,642 B2   7/2010  Plamondon
8,462,631 B2   6/2013  Plamondon
(Continued)

FOREIGN PATENT DOCUMENTS

CN   101594359 A   12/2009
CN   101087298 B    9/2010
(Continued)

OTHER PUBLICATIONS

International Search Report and Written Opinion of International Searching Authority for PCT/US2020/040161, ISA/RU, Moscow, Russia, dated Oct. 20, 2020.
(Continued)

*Primary Examiner* — William G Trost, IV
*Assistant Examiner* — Adam A Cooney
(74) *Attorney, Agent, or Firm* — M&B IP Analysts, LLC

(57) ABSTRACT

A method and system for protecting against quick UDP Internet connection (QUIC) based denial-of-service (DDoS) attacks. The system comprises extracting traffic features from at least traffic directed to a protected entity, wherein the traffic features demonstrate behavior of QUIC user datagram protocol (UDP) traffic directed to the protected entity, wherein the extract traffic features include at least one rate-base feature and at least one rate-invariant feature, and wherein the at least traffic includes QUIC packets; computing at least one baseline for each of the at least one rate-base feature and the at least one rate-invariant feature; and analyzing real-time samples of traffic directed to the protected entity to detect a deviation from each of the at least one computed baseline, wherein the deviation is indicative of a detected QUIC DDoS attack; and causing execution of at least one mitigation action when an indication of the detected QUIC DDoS attack is determined.

45 Claims, 5 Drawing Sheets

(51) Int. Cl.
*H04L 43/067* (2022.01)
*H04L 43/0876* (2022.01)
*H04L 43/16* (2022.01)

(52) U.S. Cl.
CPC .......... *H04L 43/0876* (2013.01); *H04L 43/16* (2013.01); *H04L 63/1416* (2013.01); *H04L 63/1425* (2013.01); *H04L 63/20* (2013.01)

(56) References Cited

U.S. PATENT DOCUMENTS

| | | | |
|---|---|---|---|
| 9,483,742 B1* | 11/2016 | Ahmed | H04L 63/1441 |
| 9,634,837 B1 | 4/2017 | Knecht et al. | |
| 2004/0250124 A1* | 12/2004 | Chesla | G06F 21/552 709/224 |
| 2011/0138463 A1 | 6/2011 | Kim et al. | |
| 2015/0215436 A1 | 7/2015 | Kancherla | |
| 2018/0097828 A1* | 4/2018 | Coskun | H04W 12/08 |
| 2019/0014145 A1* | 1/2019 | Levine | H04L 63/0869 |
| 2019/0182290 A1 | 6/2019 | Haddad | |
| 2019/0268305 A1* | 8/2019 | Xu | H04L 61/5007 |
| 2020/0076910 A1* | 3/2020 | Kuperman | H04L 43/0894 |

FOREIGN PATENT DOCUMENTS

| | | |
|---|---|---|
| CN | 107968785 A | 4/2018 |
| CN | 108289104 A | 7/2018 |
| CN | 106302450 B | 8/2019 |
| CN | 110266766 A | 9/2019 |
| KR | 101219796 B1 | 1/2013 |

OTHER PUBLICATIONS

Iyengar, et al., "QUIC: A UDP-Based Multiplexed and Secure Transport", pp. 1-148, Jul. 2019, Internet Draft, url.: https://tools.ietf.org/pdf/draft-ietf-quic-transport-22.pdf.

Aissaoui, et. al., "QUtor: QUIC-based Transport Architecture for Anonymous Communication Overlay Networks", Qatar Foundation Annual Research Conference Proceedings, 2016.

Hameed, et. al., "Efficacy of Live DDoS Detection with Hadoop", NOMS 2016—2016 IEEE/IFIP Network Operations and Management Symposium, Istanbul, 2016, pp. 488-494, doi: 10.1109/NOMS.2016.7502848.

Jager, et. al., "On the Security of TLS 1.3 and QUIC Against Weaknesses in PKCS#1 v1.5 Encryption", Proceedings of the 22nd ACM SIGSAC Conference on Computer and Communications Security, Oct. 2015.

Lychev, et. al., "How Secure and Quick is QUIC? Provable Security and Performance Analyses", 2015 IEEE Symposium on Security and Privacy, San Jose, CA, 2015, pp. 214-231, doi: 10.1109/SP.2015.21.

Mcmillan, et. al., "Formal Specification and Testing of QUIC", SIGCOMM: Proceedings of the ACM Special Interest Group on Data Communication, Aug. 2019.

Nagy, et. al., "Detecting DDOS Attacks Within Milliseconds by Using FPGA-based Hardware Acceleration", NOMS 2016—2016 IEEE/IFIP Network Operations and Management Symposium, Istanbul, 2016, pp. 488-494, doi: 10.1109/NOMS.2016.7502848.

Rossow, Christian, "Amplification Hell: Revisiting Network Protocols for DDOS Abuse" 2014 Internet Society, Jul. 9, 2018: ISBN: 1-891562-35-5.

Saverimoutou, et. al., "Which Secure Transport Protocol for a Reliable HTTP/2-based Web Service: TLS or QUIC?", 2017 IEEE Symposium on Computers and Communications (ISCC).

Sy, Erik, "Surfing the Web Quicker Than QUIC via a Shared Address Validation" Cornell University: arXiv: 1903.09466v1, Mar. 22, 2019.

Tong, et. al., "A Novel QUIC Traffic Classifier based on Convolutional Neural Networks", 2018 IEEE Global Communications Conference (GLOBECOM), 2018, pp. 1-6, doi: 10.1109/GLOCOM.2018.8647128.

\* cited by examiner

DETECTION AND MITIGATION DDOS ATTACKS PERFORMED OVER QUIC COMMUNICATION PROTOCOL

CROSS-REFERENCE TO RELATED APPLICATIONS

This application claims the benefit of U.S. Provisional Application No. 62/906,432 filed on Sep. 26, 2019, the contents of which are hereby incorporated by reference.

TECHNICAL FIELD

The present disclosure relates generally to network security and, specifically, to the detection and mitigation of Denial of service (DoS) and distributed denial of service (DDoS) attacks performed over a quick UDP Internet connection (QUIC) communication transport layer protocol.

BACKGROUND

The quick UDP Internet connection (QUIC) protocol is an improved UDP-based Internet transport protocol. The QUIC protocol serves a similar role to the Transmission Control Protocol (TCP) as a transport layer for connecting computers over the Internet. QUIC has several advantages over TCP, mainly in terms of enhanced performance such as reduced latency and reliability, security with persistent encryption, and also deployability with user-space run capacity and the usage of UDP. As the QUIC protocol is comparatively new, its implementation is not as widespread as is that of the TCP, and the corresponding security features remain fewer and less defined. However, in the coming years, use of QUIC as a lower-latency, higher-reliability alternative to TCP is expected to grow, particularly among enterprises, service providers, cloud providers and others. The QUIC protocol standard is currently defined by the IETF under the QUIC Work Group; a current definition may be found in the IEFT's "IEFT QUIC TRANSPORT" Internet-Draft working paper, published November 2019.

Denial of service (DoS) and distributed denial of service (DDoS) attacks are types of cyberattack where attackers overload a target computer, network infrastructure, server, or system with access requests, to the point where the target computer becomes unable to fulfill its intended purpose. DoS/DDoS attacks (hereinafter collectively referred to as DDoS attacks) can, potentially, be performed on the network layer, e.g. using TCP/UDP/Internet Protocol (IP) layer, or on various application layer, e.g. using HTTP/S layer. For example, a common type of a DDoS attack, the SYN flood, abuses TPC protocol behaviors, relying on the protocol's established "handshake" routine, allowing the attacker to flood the target with requests to synchronize, receiving the target's acknowledgment, and refusing to send the second acknowledgment which the target expects, thereby leaving the pattern incomplete, depleting target resources, and locking out legitimate users.

As implementation of the QUIC protocol grows, system administrators and network designers, as well as personal and business users, may expect to see similar attack patterns arise through abuse of QUIC communications. Relative to DDoS attacks performed over TCP connections, the detection of DDoS attacks executed over QUIC connections is comparatively difficult.

In addition, the UDP base, on which the QUIC protocol communicates, lacks rate-invariant attributes, while such attributes can be derived from TCP connections. As such, the process of detecting malicious QUIC traffic and distinguishing QUIC traffic from legitimate floods, such as flash crowd scenarios, is much more difficult for QUIC connections than for TCP connections. Prior to the adoption of the QUIC protocol, mitigation of DDoS attacks, and particularly attacks on TCP-based services (WEB), included blocking all UDP traffic. Solutions including a blanket block of UDP traffic may cause unacceptable service disruptions, and may be considered unacceptable for mitigation of attacks over a QUIC connection.

Furthermore, the QUIC protocol is designed to avoid ossification by middlebox devices (e.g., security devices like firewalls, attack mitigators, NAT devices, and others). Another challenge when analyzing QUIC traffic is that the majority of QUIC traffic may be encrypted. As such, security solutions, especially attack detection and mitigation, over QUIC, are more complex, and implementation is more challenging, than solutions for TCP-based traffic.

Additionally, due to the relative age of the protocol, techniques for identifying, characterizing, and mitigating attacks over QUIC connections are less-developed and are not optimized. As such, computers and servers communicating over QUIC are at higher risk for cyber-attacks.

It would therefore be advantageous to provide a cyber-security solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method, a system, and computer readable medium for protecting against quick UDP Internet connection (QUIC) based denial-of-service (DDoS) attacks. The method comprises extracting traffic features from at least traffic directed to a protected entity, wherein the traffic features demonstrate behavior of QUIC user datagram protocol (UDP) traffic directed to the protected entity, wherein the extract traffic features include at least one rate-base feature and at least one rate-invariant feature, and wherein the at least traffic includes QUIC packets; computing at least one baseline for each of the at least one rate-base feature and the at least one rate-invariant feature; and analyzing real-time samples of traffic directed to the protected entity to detect a deviation from each of the at least one computed baseline, wherein the deviation is indicative of a detected QUIC DDoS attack; and causing execution of at least one mitigation action when an indication of the detected QUIC DDoS attack is determined.

Certain embodiments disclosed herein include a method, a system, and computer readable medium method for protecting against quick UDP Internet connection (QUIC) based denial-of-service (DDoS) attacks. The method comprises extracting at least one rate-base feature from at least traffic directed to a protected entity, wherein the at least one rate-base feature demonstrates behavior of QUIC user datagram protocol (UDP) traffic directed to the protected entity, and wherein the at least traffic includes QUIC packets; computing at least one baseline for each of the at least one rate-base feature; analyzing real-time samples of traffic directed to the protected entity to detect a deviation from each of the at least one computed baseline, wherein the deviation is indicative of a detected QUIC DDoS attack; and causing execution of at least one mitigation action when an indication of the detected QUIC DDoS attack is determined.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
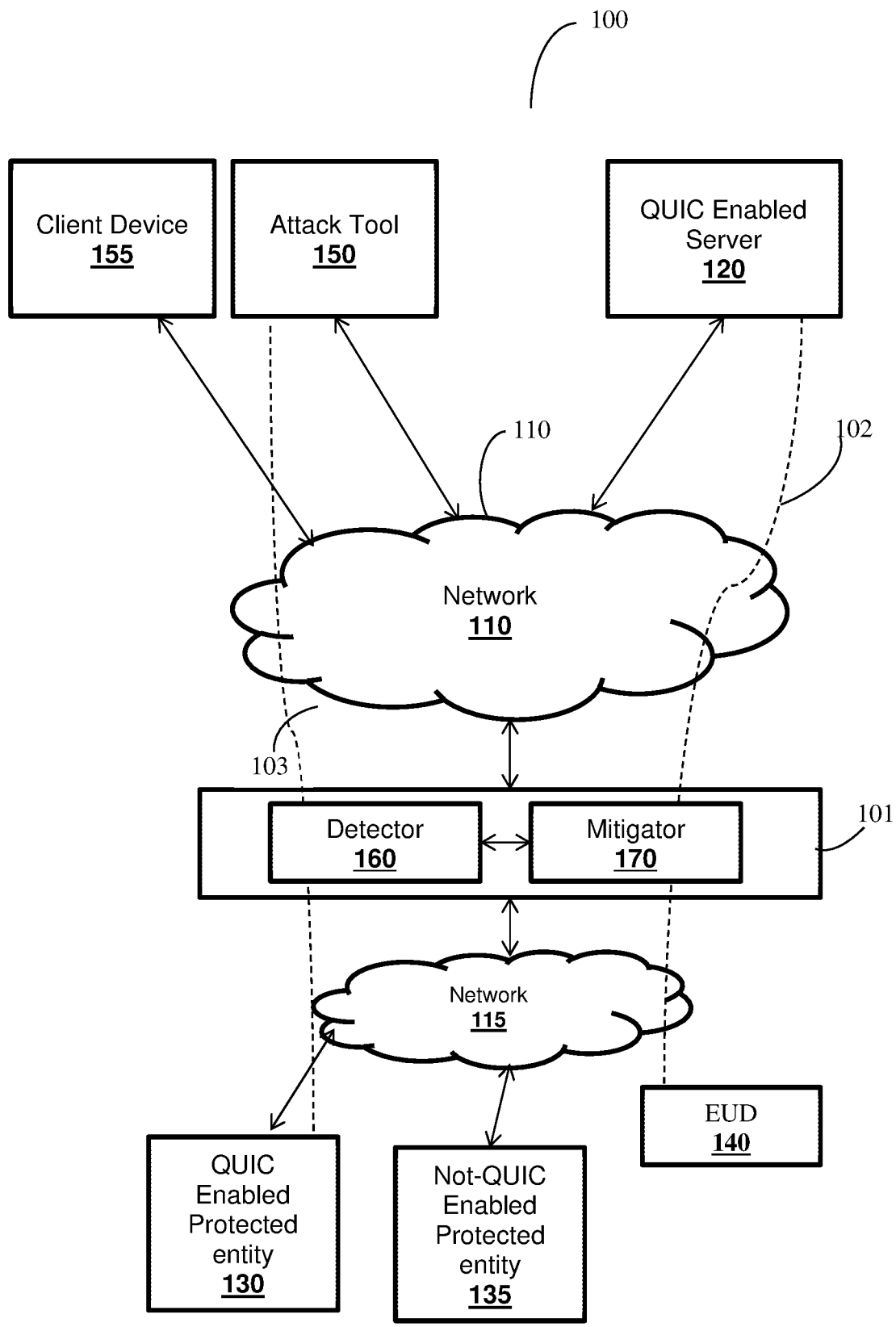
FIG. 1 is a network diagram utilized to describe the various embodiments for detecting and mitigating QUIC DDoS attacks by a detector according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 depicts an example network diagram 100 utilized to describe the various embodiments for detecting and mitigating DDoS cyber-attacks performed over the QUIC communication protocol (hereinafter QUIC DDoS attacks).

In the example FIG. 1, a network 110 enables a connection between a QUIC-enabled server 120 and protected entities 130 and 135. In yet another embodiment, only one of the protected entities, 130 or 135, is deployed. Each of the protected entities may include a server, a WEB server, a media server, and the like. Each such server may be realized as a physical server or a virtual entity (e.g., a function, a software container, a microservice, etc.).

In an example deployment, also illustrated in FIG. 1 is an end-user device (EUD) 140, which can be any user device, such as a desktop computer, a laptop computer, a mobile device, a handled device, and the like. A client device 155 and an attack tool 150 are also connected to the network 110 and can send QUIC traffic toward the protected entities, 130 and, or, 135. In order to demonstrate the disclosed embodiments, the client device 155 is a legitimate client (operated by a real user and a QUIC-enabled browser), the and the attack tool is operated, for example, by a bot. Further, the protected entity 130 is a QUIC enabled server and the protected entity 135 is a server that does not communicate using a QUIC transport protocol but, rather, using the TCP protocol.

The EUD 140 can utilize a QUIC protocol to communicate over the networks (110 and 115) with the QUIC-enabled server 120.

Generally, the network 110 may be any type of communication network, such wireless, cellular, a local area network (LAN), a wide area network (WAN), the internet, or any combination thereof. A network 115 is also illustrated in FIG. 1. The network 115 may be an edge network and may include an enterprise datacenter, an enterprise system, a mobile network, broadband networks, and the like.

The detection of QUIC DDoS attacks is performed by a defense system 101 configured to perform the various disclosed embodiments. The defense system 101 includes a detector 160 and a mitigator 170. In one embodiment, the defense system 101 is deployed in-line between the protected entities 130, 135 and the network 110 and configured to inspect inbound and outbound traffic to and from the entities 130, 135 and the EUD 140. In another example embodiment, the defense system 101 is configured to inspect inbound traffic only.

Figure 2:
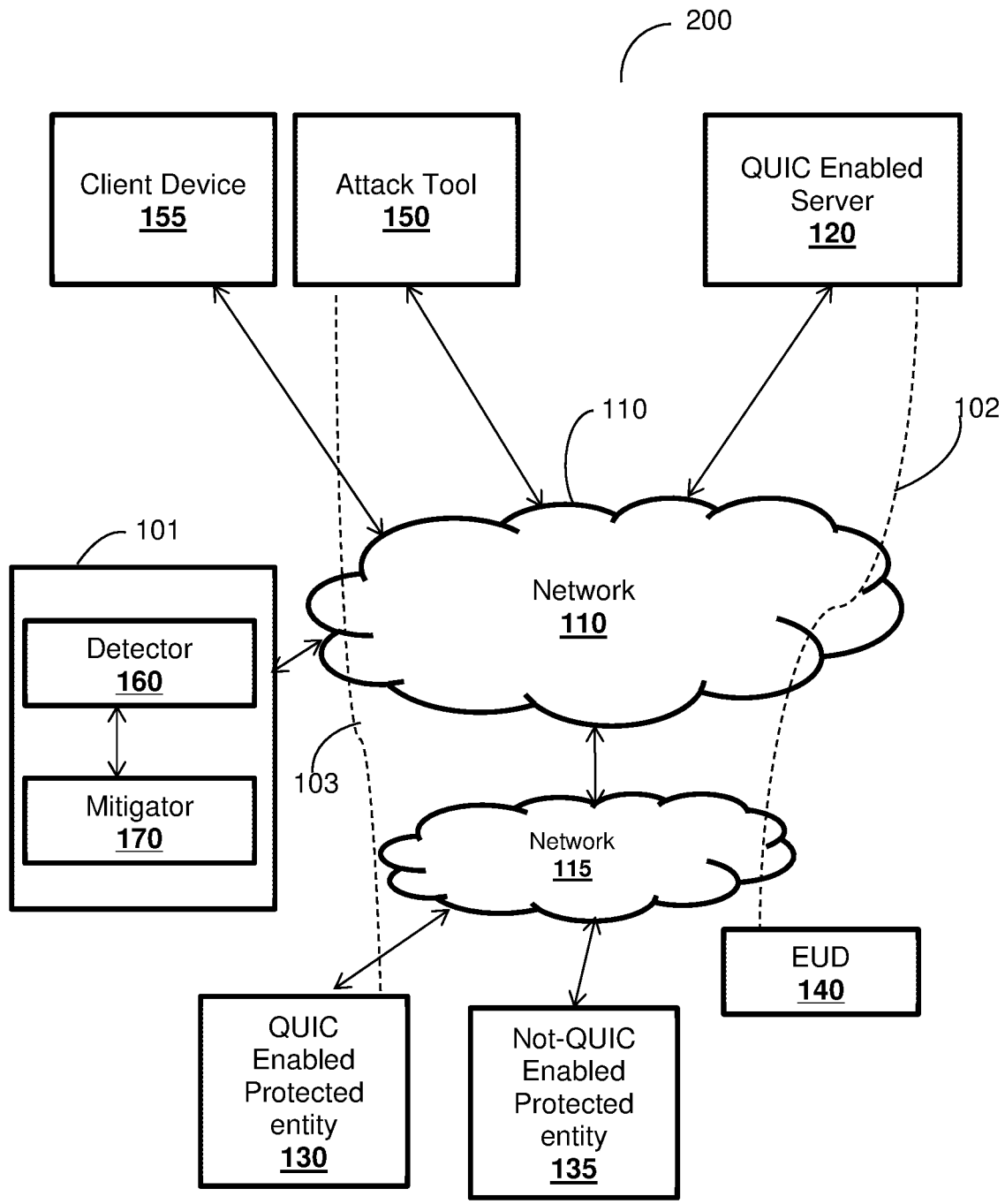
FIG. 2 is a network diagram illustrating an out-of-path deployment of the detector according to another embodiment.

In another embodiment, illustrated in FIG. 2, the defense system 101 is deployed out-of-path and is configured to receive traffic features from the protected entities and the networks 110 and 115. The embodiments for analyzing the traffic to detect and mitigate attacks are similar in both deployments. It should be noted that in receiving various traffic features from the network 110, the deployment in FIG. 2 also enables protecting the network 110 from QUIC-based DDoS attacks. Embodiments may be discussed with reference to FIG. 1 to facilitate an understanding of examples according to an embodiment.

The mitigator 170 may be utilized to mitigate a detected DDoS attack. The mitigator 170 may include traffic scrubbing functionalities (to remove malicious traffic and return clean traffic to the protected entity), a resource configured to generate a web and other challenges, an alert system, and the like, or any combination thereof. The detection and mitigation of QUIC DDoS attacks may include mechanisms to handle, and protect against, various types of such attacks including, but not limited to, QUIC UDP floods, QUIC connection floods, and QUIC HTTP floods, where all are performed over a QUIC communication protocol in various ways. In an example embodiment, the attack tool 150 can use each of the above approaches separately over a period of time, or a combinations of these attack types, concurrently.

The defense system 101 continuously inspects inbound and, in an embodiment, the outbound, QUIC traffic to and from the protected entities 130, 135, network 110, network 115, and EUD 140. Over a typical deployment, traffic to or from protected entities 130, 135, demonstrates a relatively high volume and consistency. However, QUIC traffic to and from the EUD 140 (as an endpoint) demonstrates "burst" characterization, with relatively low volume and sparse traffic periods.

To initiate various strategies of QUIC flood attacks, the attack tool 150 uses QUIC UDP traffic to generate a maliciously crafted flood of UDP traffic towards a designated destination victim. Attackers abusing the QUIC protocol to generate DDOS flood attacks can potentially take several approaches to execute a QUIC based DDoS attack. Attacks can be executed using a single approach, or as multi-vector attacks composed from a combination of the possible approaches.

The attack tool 150 can generate attacks in the form of QUIC UDP floods, specifically using QUIC UDP traffic (port 443 or 80) to generate a flood of QUIC unstructured UDP traffic directed toward the protected entities. In this case, the traffic generated by the attack tool 150 does not necessary comply with the QUIC protocol standard. The attack is executed by simply issuing streams of very high volumes of QUIC traffic composed from QUIC long header and/or QUIC short header packets. In another example, the attack tool 150 can use network layer DDoS floods attack tools (e.g. HPING with or without spoofing its IP addresses), rather than the full comprehensive QUIC stack, in order to fulfil its objective by overwhelming the victim network infrastructure. Here, the attack tool 150 abuses the fact that UDP traffic cannot be blocked in order to mitigate UDP based floods.

In yet another example, the attack tool 150 is used to execute QUIC HTTP floods attack by using QUIC traffic to simulate legitimate-appearing QUIC traffic in order to generate a high volume of UDP traffic that overwhelms network infrastructure and, potentially, the protected entities' resources. The attack traffic fully complies with the QUIC standard and, therefore, is composed of floods of "legitimate-appearing" QUIC connections. In yet another example, the attack tool 150 uses HTTP/3-based flood tools, or similar, which use QUIC as a transport layer.

In yet another example, the attack tool 150 executes QUIC connection floods attack by sending, during a short time period, large number of QUIC connection initiation requests, i.e., floods of QUIC long header or Initial packets with requests to initiate QUIC connections, toward a designated destination victim, 130 or 135. The number of such requests may range from thousands to hundreds of thousands, or millions of requests per second. The requests are then accepted by a protected entity (e.g., entity 130) and new connections are initiated. The attack tool 150 can continue sending QUIC connection initiation requests regardless of whether the protected entity 130 (or even an embodiment the 135) responds to such requests.

The QUIC Connection floods can also be in a form of floods of "stateful" QUIC connections. In this case, the attack tool 150 fully complies with the QUIC standard, and is able to complete the connection setup and uses these established QUIC connections to overwhelm the QUIC-enabled protected entity 130 with high numbers of concurrent QUIC connections comprising high volumes of byte and packets, long duration, short duration, and combinations of such strategies.

QUIC DDoS attacks can originate over the Internet or inside the service provider's network. The QUIC attack can address the attached organization's "online" services' IP addresses. Further, some QUIC attack traffic can target the organization's NAT addresses rather than the addresses of the organization's connected services. This embodiment mainly occurs when the attack target is the EUD 140.

To summarize, the main types of QUIC DDoS attacks include QUIC UDP floods; QUIC HTTP floods; and QUIC Connection floods. The QUIC UDP floods attack type is characterized by high volume of UDP traffic overwhelming the network infrastructure or can be characterized by high volume of request to initiate QUIC connection, overwhelming server's resources. The QUIC HTTP floods attack type is characterized by high volume of QUIC connection traffic overwhelming a network infrastructure and high volume of concurrent QUIC connections overwhelming server's resources. The QUIC Connection floods attack type is characterized by high volume of QUIC connection ingress traffic overwhelming a network infrastructure and/or high volume of requests to initiate QUIC connections overwhelming server's resources, and/or high volume of concurrent QUIC connections overwhelming server's resources.

To defense the protected entities and network infrastructure, various protections are provided by the defense system 101. These protections include: QUIC "Floods" protection to protect against malicious increasement of UDP byte and/or packets; QUIC "Connection Initiation" protection to protect against malicious increasement of QUIC long header packets; and QUIC "Connection Limit" protection to protect against malicious increasement in number of existing/new QUIC connection.

An example illustrative of the transmission of a QUIC connection may include QUIC packets, QUIC streams, and QUIC frames. Upon establishing, or setting up, a QUIC connection, a client node connects with its peer (e.g., server or host node). The established connection has a specified UDP communication port which is generally, but not exclusively, port 443 or port 80, as well as a unique QUIC ConnectionID.

A QUIC connection supports transport features traditionally supported by both TCP and TLS protocols collectively including, but not limited to, transport handshakes, congestion control and avoidance, flow control, TLS 1.3 encryption handshakes, other security features, and the like. Each QUIC connection is identified based on source and destination ConnectionIDs. The ConnectionID does not uniquely identify a single QUIC connection and, as the ConnectionID can be updated during the QUIC connection, several ConnectionIDs may be identified for the same single QUIC connection. It may also be noted that the actual definition of QUIC protocol behavior is defined as an ongoing effort by the IETF QUIC WG.

In an example illustrating the contents of a QUIC packets, as defined by the IETF QUIC WG, the QUIC packets may be composed from clear headers and encrypted payloads. Two types of QUIC packets are hereby defined as long-header QUIC packets and short-headers QUIC packets.

The long-header QUIC packets are sent using a plain text long-header along with the QUIC packet encrypted payload and are used during the process of QUIC connection handshake to establish the QUIC connection and mutually exchange various attributes about a peer system (mainly transport and cryptographic attributes). The long-header plaintext QUIC packet can be identified by the "header form bit" which appears in the QUIC header in clear text. The long-header also includes the destination ConnectionID and the source ConnectionID, as a clear attribute, simply identifying the QUIC connection the long-header QUIC packet belongs to. In an embodiment, the actual QUIC connection initiation request is performed by a specific type of long-header QUIC packet, the "Initial Packet".

The short-header QUIC packets are sent using plain text short-headers and are used once the QUIC handshake is established to communicate data over the QUIC connection. The short-header QUIC packet can also be easily identified by the clear "header form bit". The short-header QUIC packet may also include a destination ConnectionID in clear text, allowing for simple identification of the QUIC connection the packet belongs to.

According to the disclosed embodiments, by continuously examining the plain information residing in the plain-text long-header and short-header of QUIC packets, the defense system 101 is configured to detect and mitigate anomalous traffic and the various cases of the above-mentioned, and other, DDoS attacks.

In an embodiment, a number of long header packets per second, as directed toward the protected entity, is proportional to the number of QUIC connections its clients (e.g., client devices 155 or attack tool 150) attempt to establish. Therefore, anomalies detected over this attribute can be used as an indicator for QUIC Connection floods in the form of large numbers of requests to initiate QUIC connections.

In another example, the number of QUIC long-header packets of the type "Initial Packet" can also provide an even more granular assessment of the number of QUIC connections, clients, or attack tools 150 connected users may attempt to establish. This feature is extracted by counting a number of packets designated as long-header packets of the type "Initial Packet" received during a predefined timeframe.

In another embodiment, the number of distinct active ConnectionIDs (defined as the number of unique ConnectionID which had a non-zero number of bytes and packets sent over it over a pre-defined period of time) appearing in short-header, and also in long-header, packets and directed toward the protected entity, may be in proportion with the concurrent active QUIC connections. Therefore, an anomaly detected over this attribute may be used as an indicator for QUIC Connection floods in the form of a large number of concurrent QUIC legitimate-appearing connections launched by an attacker. In a similar way, counting the number of distinct new active ConnectionIDs appearing in short-header and long-header packets sent to the protected entity, can be in a proportion to the rate of new active QUIC connections over a period of time. An anomaly can be detected over this attribute to be further used as an indicator for QUIC Connection floods QUIC DDoS attack type.

In an example embodiment, the number of bytes and packets over active ConnectionIDs appearing in short and long header packets sent to the protected entity, can be in proportion with the QUIC connections' average size. An anomaly detected over this attribute can be used as an indicator for QUIC HTTP floods and QUIC Connection floods. Here, an anomaly may be detected based on an increase or decrease in the average QUIC connection size.

The above-mentioned attributes are mainly measured at the inbound direction, that is, from the network 110 toward the protected entity. It should be appreciated that such traffic attributes may also be measured in the opposite outbound direction as well.

Therefore, in order to detect and mitigate anomalous traffic patterns, the defense system 101 may be configured to assess certain rate-based attributes, as well as certain rate-invariant attributes, continuously baseline these attributes, and search for anomalies in these attributes over time. The rate-based attributes are required to find cases on of increasing traffic rate, or floods, over various QUIC traffic components, while the rate-invariant attributes are used to distinguish malicious floods, or attacks, from legitimate cases of floods, like flash crowd scenarios.

According to the disclosed embodiments, detection of various types of QUIC DDoS attacks is performed by the detector 160. With this aim, the detector 160 is configured to extract traffic features including rate-base and rate-invariant traffic features. Each type of QUIC DDoS attack may be detected using a suitable set of traffic features. The traffic features are extracted from the inspected traffic or received telemetries. The extracted features are baselined, and then any anomaly is detected based on the respective baselines and the comparison of these baselines to the corresponding real-time values. In yet another embodiment, the detector 160 is configured to extract and analyze only rate-based features.

Figure 3:
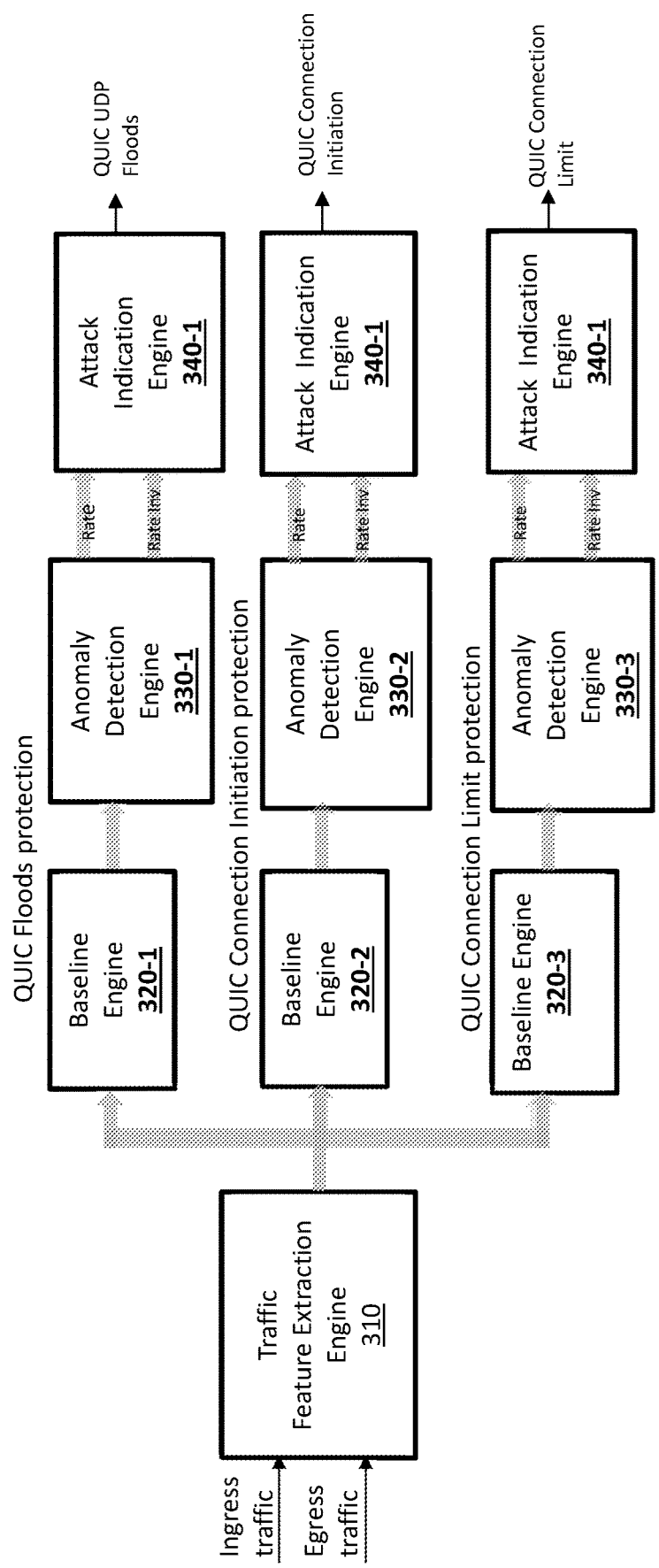
FIG. 3 is a diagram illustrating the operation of the detector according to an embodiment.

The operation of the detector 160 is further demonstrated in FIG. 3. The detector 160, when deployed in-line, is configured to receive inbound/outbound traffic, to and from the protected entities 130 and 135, and extract traffic features from the received traffic. In an example implementation, a feature extraction engine 310 is configured to extract, or otherwise compute, the traffic features. Various example embodiments for feature extraction are discussed herein. In yet another implementation, where the egress traffic may not be available as the deployment of the detector can be asymmetric, the feature extraction is realized over the ingress traffic only.

According to the disclosed embodiment, in order to provide QUIC floods protection, it is required to first detect cases of QUIC floods. With this aim, the following rate-base traffic features are extracted: a number of long header packets per second; a number of QUIC total packets per second; and a number of QUIC total bytes per second (i.e., the bandwidth or total accumulated number of bytes contained in the QUIC packets over the last second). Further, the following rate-invariant traffic features are extracted: the averages of QUIC packet size for both long and short headers; the long header ratio, i.e., the ratio between QUIC Long Header packets (and bytes) to the total QUIC packets (and bytes) and the ratio between QUIC Long Header packets (and bytes) to QUIC Short Header packets (and bytes); and a number of bytes and packets per Active ConnectionID for both long and short header.

In order to provide QUIC "Connection Initiation" protection, it is required to first detect cases of anomalies over the set of requests to initiate QUIC connections towards the protected entities 130 and 135. With this aim, the following rate-base traffic features are extracted: a number of long header packets per second; and a number of long header packets set as "Initial Packet" per second. Further, the following rate-invariant traffic features are extracted: a ratio between a number of packets with a long header set as "Initial Packet" and the total packets with long headers; a ratio between packets with a long header and a packets with long headers set as "Initial Packet"; a ratio between packets with long header and a client hello packets; a ratio between client hello packets and long header packets; and the ratio between packets with long header to all traffic (in bytes and packets). These features may be generally referred to as long header ratios.

In order to provide QUIC "Connection Limit" protection, it is required to first detect anomaly over the number of existing and new QUIC connections managed by the protected entities 130 and 135. With this aim the following rate-base traffic features are extracted: a number of active ConnectionIDs per second; and a number of new active ConnectionIDs per second. Further, the following rate-invariant traffic features are extracted: an increase in the average numbers of bytes per active ConnectionID for both long and short headers; and a decrease in the average number of bytes per active ConnectionID for both long and short headers.

The extraction of the above-noted traffic features includes monitoring a UDP port (e.g., port 443 or port 80) and inspecting the clear header of the QUIC protocol. The header is a plain-text header (i.e., not encrypted). There are two types of header: long and short designated using a "header form bit", which is set to a value of '1' (long header) or '0' (short header).

To extract the number of long header packets per second feature, the detector 160 is configured, for each time frame (e.g., 1 second), to count all packets received on a UDP port with the "header form bit" set to '1' (i.e., long header).

To extract the number of QUIC packets per second feature, the detector 160 is configured, for each time frame (e.g., 1 second) to count all packets received on a UDP port. To extract the number of bytes per second feature, the detector 160 is configured, for each time frame (e.g., 1 second) to count all bytes over all packets of data received on a UDP port. To extract the average QUIC packet size feature, the detector 160 is configured to divide the number of QUIC packets per second by the number of bytes per second. To extract the long header portion feature, the detector 160 is configured to divide the number of long header packets per second by the number of QUIC packets per second. To extract the long header with Initial Packets portion feature, the detector 160 is configured to divide the number of long header packets per second by the number of QUIC long header packets with type Initial Packets per second.

To extract the number of average bytes and packets per active ConnectionID, the detector 160 is configured to count all traffic received on a QUIC UDP port, belonging to each active ConnectionID. This includes bytes and packets for packets with short header and long header traffic. Then, the detector 160 is configured to sum all the counts and divide by the number of active ConnectionIDs. The ConnectionID is designated in the header. It should be noted that each QUIC connection is identified based on source and destination ConnectionID. The ConnectionID does not uniquely identify a single QUIC connection and, as the ConnectionID can be updated during the QUIC connection, several ConnectionIDs may be identified for the same single QUIC connection.

As further demonstrated in FIG. 3, the extracted features are fed into a baseline engine 320-1, 320-2, and 320-3, each of which is configured to operate on a set of features demonstrating the behavior of a different type of QUIC DDoS attack, as labeled in the example FIG. 3. It should be noted that a baseline may be computed for each traffic feature (rate-base and rate invariant).

Each baseline engine 320 may employ various techniques to compute a baseline for each traffic feature. However, as QUIC traffic may display a "burst" characterization (as addressed to the EUD 140), a baseline is computed by factoring such burst behavior, i.e., periods with no traffic followed by high bursts on UDP with high levels of traffic (legitimate or attack).

A baseline for a rate-base or rate-invariant feature is computed during a learning period, which may be set to a predefined time window or until enough data is gathered and collected. A baseline is established during peace time or data is gathered at peace time, i.e., when no attack traffic is detected. A baseline may be continuously computed for each feature based on the samples of the various traffic features of the inspected traffic. In an embodiment, the baselines are mainly determined during "burst" (active traffic) periods and less during the "down" periods.

In one embodiment, two types of baselines are computed for each traffic feature, a short-term and long-term baseline. The short-term baseline is computed for a short-term, i.e., computed for changes that are roughly short in their longevity. The short-term period may be, for example, an hour. The short-term baseline is utilized to follow hourly changes in QUIC traffic, and, therefore, detect anomalies caused due to relatively rapid changes in the QUIC traffic's behavior, as can be observed during attack time. It is valuable to follow hourly changes in traffic in order to eliminate high attack thresholds during high and low time periods, and to also follow changes in legitimate traffic during busy periods or similar.

The long-term baseline is computed for a long-term, i.e., computed changes that reflect long-term period trends in traffic. The long-term period may be, for example, a week. The long-term baseline is utilized to detect anomalies caused due to slow changes in the traffic's behavior. The long-term baseline compliments the short-term baseline because it can eliminate cases when attackers "slowly" change the attack load, which can be computed as legitimate baselines.

The long-term baseline can be computed using IIR LP filters configured with low-frequency defined pass-band and stop-band (e.g., on the order of magnitude of 1/week), while the short-term baseline can be computed using an IIR LP filter with a higher pass-filter and stopband filter (e.g., with an order of magnitude of 1/hour and 1/minute, respectively). The two baselines computed for each traffic feature are kept. It should be noted that each baseline is continuously updated.

To account for the burst-character behavior of the monitored traffic, especially for the case of traffic addressed to EUD 140, a baseline is computed based on the following assumptions: an expectation of zero traffic periods followed by bursts of UDP, with high levels of traffic, may be legitimate traffic or may be attacks. Further, during the learning period, an on-going, calculation of the fraction of legitimate traffic, X, where X may be user-defined, possibly in the range of thirty to fifty percent is necessary. Further, during the baseline continuous calculation, elimination of the calculated baseline to go below the X percentile value is necessary. The X percentile should be updated in a timely manner.

Similarly, the count of the burst-character behavior of the monitored rate invariant traffic attributes, especially for the case of traffic addressed to the EUD 140, is actively performed only for the cases the real time traffic value is above the X percentile of the traffic.

The baselines computed by the baseline engines 320-1, 320-3, and 320-3 are fed into the respective anomaly detection engines 330-1, 330-3, and 330-3. Each of the engines 330-1, 330-3, and 330-3 is configured to detect various deviations from the determined baselines to detect traffic anomalies.

In an embodiment, anomaly detection is performed by dynamic learning, during peace time, of the typical maximal deviation of various traffic features from their momentary computed baselines. States where real time samples of each traffic feature exceed the baseline in amounts equal or greater to/from the maximal deviation continuously for some time, are considered as anomalies.

As an example, an anomaly baseline threshold may be determined as follows:

$$U(t)=Y(t)+\max \mathrm{Dev}(t)$$

where $U(t)$ is an anomaly threshold, $Y(t)$ is the baseline, and max $\mathrm{Dev}(t)$ is the maximum deviation of an observed traffic feature during peace-time corresponding to the required value of the false positive detection rate of the observed traffic feature. For the given false positive rate, the max Dev(t) is considered as the maximum "legitimate" deviation from the momentary baselines; it is also updated with each new sample.

The max Dev value is continuously computed during the learning period and during peace time, as a measurement for the actual legitimate deviation from the momentary baseline of the various traffic features. The max Dev value allows for anomaly detection, as it compares the legitimate deviation in traffic (due to legitimate traffic statistics behavior), to deviations caused by malicious activities. The max Dev is separately computed against the short-term and long-term baselines.

In an embodiment, the max Dev is computed using the measured standard deviation σ multiplied by a constant multiplier ρ. That is:

$$\max Dev = \rho\sigma$$

As the standard deviation is measured against the various relevant traffic features and others. The standard deviation is computed during peace time over each of the abovementioned traffic features for their corresponding baselines. The value of the multiplier ρ may be related to the desired false positive detections of observed feature. The multiplier ρ is a preconfigured parameter defining the sensitivity.

In yet another example embodiment, the maxDev is computed based on a value of difference 'Δ' between the current sample and the computed short-term, and also, in separate calculation, the long-term, baseline and an index clipping the last highest FP×N samples from the virtual set of the last N samples, where FP is the permitted false positive rate. The samples in '$\Delta_n$' are sorted in descending order, where the entire virtual set is continuously updated. That is, the max Dev value may be computed as follows:

$$\max Dev = (\Delta_n : n = \lceil (1-FP)N \rceil)$$

To detect anomalies, for each traffic feature, its real-time value (e.g., real-time AveragePacketSize value) is compared to its respective baseline's threshold. Illegitimate deviation from the respective baseline's threshold is determined as anomalous. In an embodiment, an anomaly indication is issued only after detection of a number of pre-defined consecutive anomalies of the same features or features related to the same type of attack.

To detect the various QUIC DDoS attacks, each of the engines 340-1, 340-3, and 340-3 is configured to analyze rate based and rate invariant detected anomalies and decide when actual DDoS attacks are launched. In an embodiment, a DDoS attack indication is triggered when anomalies are detected on at least one rate invariant traffic feature and at least one rate invariant feature. In yet another embodiment, fuzzy logic between these various features can be implemented to generate an attack indication logic. In another example implementation, only rate-based features are analyzed so that a DDoS attack indication is triggered when anomalies are detected on at least one rate-based traffic feature.

Returning to FIG. 1, according to an example embodiment, a detected attack can be mitigated using one or more mitigation actions performed by the mitigator 170. Such actions include sending alerts, blocking traffic from sources suspected to be an attack tool 150, limiting the rate of traffic, applying one or more web challenges or QUIC-based challenges, and so on. A mitigation action may include a combination of mitigation actions, and such a combination may be in an escalated order. The mitigation actions to be applied may be selected based on the type of the detected QUIC DDoS attack, a profile of the protected resource, or any combination thereof. For example, to mitigate QUIC flood attacks, QUIC-based challenges can be used. However, this action cannot be used to provide QUIC Connection Limit protection.

Similarly, for FIG. 2, in another example embodiment, a detected attack may be mitigated using one or more mitigation actions performed by the mitigator 170, deployed out-of-path. Upon detecting an attack on the protected entity 130 and/or 135, the attack traffic is directed to the mitigator 170 for execution of one of more of the mitigation actions discussed above.

In an embodiment, a QUIC-based challenge is based on a mechanism defined in the QUIC communication protocol standard by the IETF QUIC WG. The mechanism is the QUIC address validation process which is intended to providing protection against "amplification DDoS" attacks by enabling QUIC server to validate a client IP address as a "real IP" and not a fake spoofed IP address. Here, the mitigator 170 is configured to check that a source with a valid IP sends the traffic and not a stateless bot. Upon detecting an attack, the mitigator 170 is configured to initiate its own address validation process on each new client source IP address being detected by the mitigator 170. In an embodiment, the address validation process is realized against a partial list of new source IPs, the mitigator 170 is further configured to identify the list of IP addresses suspected to be attack tools 150 initiating the malicious QUIC UDP flood attacks. Traffic from entities that failed the address validation process can be blocked, or rate limited, by the mitigator 170.

Web challenges can also be used to distinguish between a legitimate source and a stateless bot. In an embodiment, the mitigator 170 is configured to challenge a suspicious source using an encrypted client web challenge, such as, but not limited to, a 302 HTTP redirect message, a redirect script, a CAPTCHA challenge, and the like.

In an embodiment, the mitigation action can be based on signature generation, such as QUIC UDP packets (port 443) with size of 1000 bytes and Long Headers, or QUIC UDP packets (DEST port 443) and source port '123456' and TTL=50. This mitigation action can be efficient against QUIC UDP flood types of attacks, which do not comply with the QUIC standard.

According to an embodiment, the detector 160 is configured to detect attacks directed to the protected entities 130 and 135. The protected entities 130 and 135 can be also affected in cases of the network 115 congestion due to flood attacks against the EUD 140. In other cases, bursts of legitimate traffic arriving from QUIC-enabled server 120 at the EUD 140 are not expected to indicate an attack as the baseline calculation eliminates the "silent" periods, and as the high periods are expected to introduce legitimate rate invariant behavior.

When attacking the protected entity 130 directly, the attack tool 150 can abuse the QUIC open UDP port to launch QUIC DDoS floods, from various types and volumes, toward the protected entity 130 and its QUIC-enabled services. The attack patterns may be comprised of floods of UDP packets and QUIC connections. Such patterns may be generated by the attack tool 150 to be compliant or non-compliant with the QUIC protocol standard. It should be noted that, when not detected, the traffic between the protected entity 130 and the attack tool 150 can be viewed and served as legitimate traffic.

It should be noted that TCP-based DDoS detection techniques would detect legitimate QUIC traffic between the EUD 140 and the QUIC-enabled server 120 (over the connection labeled 103) as an attack, thereby generating false positive alerts.

It should be appreciated that an implementation of QUIC attack detection and mitigation solutions may prove useful as applied to QUIC traffic originating from within an organization or from the service provider and the global Internet (WWW) and directed toward an external target. In such circumstances, the malicious traffic should be distinguished from legitimate inbound and outbound QUIC traffic. As a QUIC DoS/DDoS attack, targeted outside of the organization's network, can still consume valuable network resources, reducing the organization's capacity, such attacks are well suited for rapid detection and mitigation.

In an embodiment, the defense system 101 may be deployed in a cloud computing platform and/or in an on-premise deployment, such that they collocate together. The cloud computing platform may be, but is not limited to, a public cloud, a private cloud, or a hybrid cloud. When installed in the cloud, the defense system may operate as SaaS.

In a further embodiment, multiple detectors and mitigators can be utilized to perform the various disclosed embodiments. The detectors and mitigators may be configured with different capacities and/or resources and may be further deployed in various locations in the network, as in-line or out-of-path deployments, to provide a multi-tier defense. An example arrangement, configuration and orchestration of a multi-tiered mitigation system is disclosed in U.S. Pat. No. 9,769,201, assigned to the common assignee, which is hereby incorporated by reference.

It should be noted that although one attacker device, one QUIC-enabled protected entity, one not-QUIC-enabled protected entity, one EUD, and one QUIC-enabled server are depicted in FIGS. 1 and 2, merely for the sake of simplicity, the embodiments disclosed herein can be applied to a plurality of such elements. The various elements may be located in different geographical locations.

It should be further noted that all or some of the engines discussed with reference to FIG. 3 can be implemented in software, firmware, hardware or any combination thereof. The hardware can be realized to include at least a processing circuitry and a memory, examples of which are provided below. In an embodiment, the defense system 101 can include all the detection and mitigation mechanisms described herein, or even a partial list of these detection or mitigation mechanisms.

Figure 4:
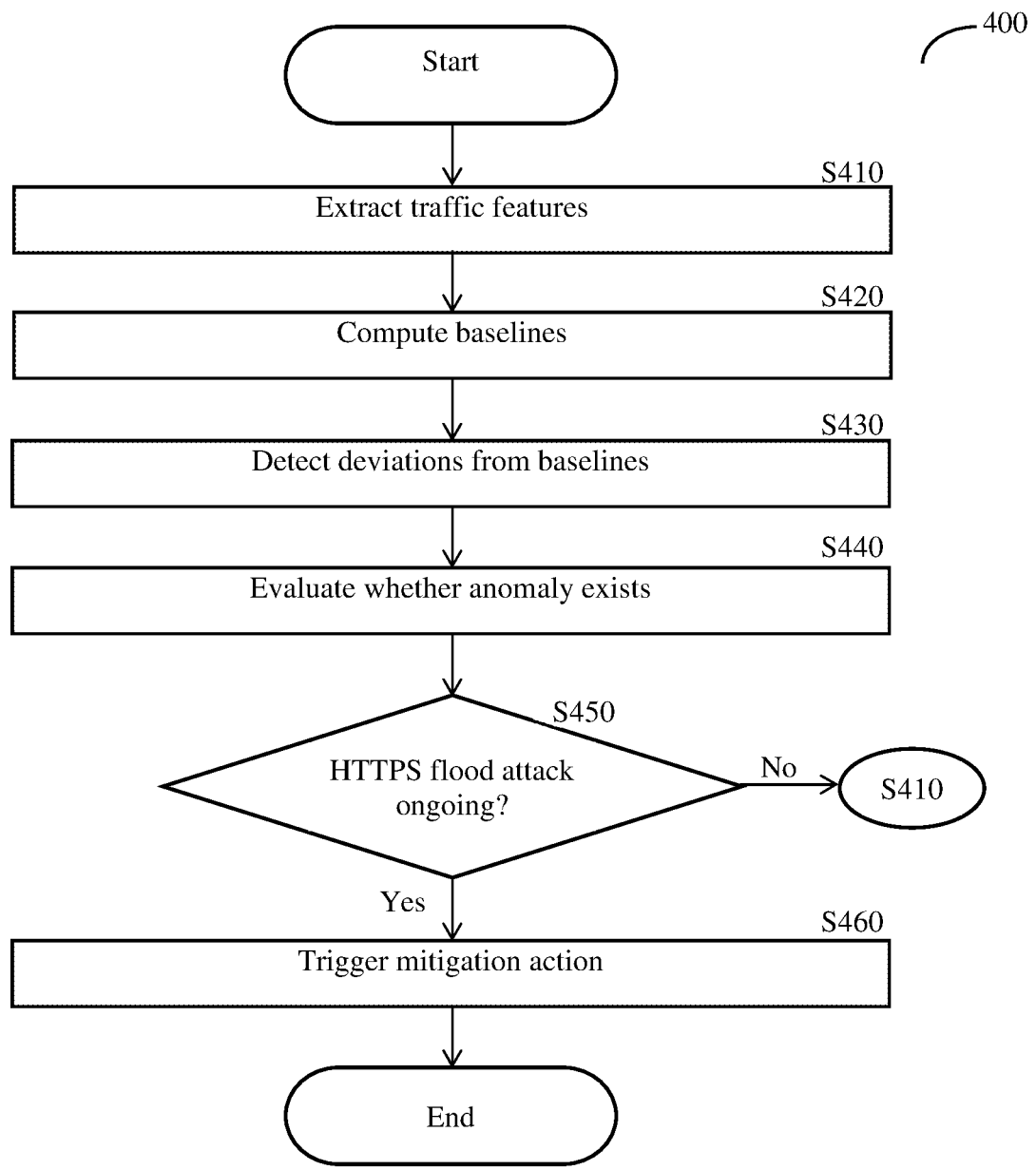
FIG. 4 is an example flowchart illustrating a method for detecting QUIC DDoS attacks according to an embodiment.

FIG. 4 shows an example flowchart 400 illustrating a method for detecting and mitigating QUIC DDoS attacks according to an embodiment. The detected QUIC DDoS attacks may include, for example, QUIC UDP floods, QUIC HTTP floods, QUIC connection floods, and the like. The method may be performed by the detector 160.

At S410, traffic features are extracted from inbound and outbound traffic directed to or from a protected entity. In an embodiment, the traffic features are extracted from telemetries collected by, for example, the protected entity. The traffic features include rate-base and rate-invariant features and demonstrate behavior of UDP traffic directed to the protected entity. Each type of QUIC DDoS attack may be detected using a different set of traffic features. Examples for rate-base traffic features include: a number of long header packets per second, a number of QUIC packets per second, and a number of QUIC bytes per second, a number of long header packets set as "Initial Packet" per second, a number of active ConnectionIDs per second, and a number of NEW active ConnectionIDs per second. Examples for rate-invariant traffic features include: an average QUIC packet size, a long header ratio, an average number of bytes and packets per Active ConnectionID, a long header ratio, and increase and decrease in the average number of bytes per active ConnectionID. The various example embodiments for traffic feature extraction are discussed above.

At S420, at least one baseline is computed for each extracted traffic feature. The baselines may be computed during a learning period, which may be set to a predefined time window or configured to end when enough data is gathered and collected. A baseline is established during peace time or data is gathered at peace time, i.e., when no attack traffic is detected.

According to the disclosed embodiments, at least one baseline is continuously computed based on samples of the traffic features to determine normal activity of rate-base and rate-invariant features of the inspected traffic. As noted above, two types of baselines may be computed for each traffic feature, a short-term and long-term baseline.

At S430, after baselining of the rate-base and rate-invariant traffic features, various deviations from the computed baselines are to be detected as traffic anomalies. In an embodiment, the anomaly detection is performed by dynamic learning, during peace time, of the typical maximal deviation of traffic from its momentary computed baseline. States where real time samples of each traffic feature exceed the baseline in amount equal or greater to/from the maximal deviation continuously for some time, are considered as anomalies.

In an embodiment, a baseline threshold may be determined as follows:

$$U(t)=Y(t)+\max \text{Dev}$$

where $U(t)$ is an anomaly threshold, $Y(t)$ is the baseline, and max Dev is the maximum deviation of an observed traffic feature during peace time, corresponding to the required value of the false positive detection rate of the observed traffic feature. The max Dev is considered as the "legitimate" deviation from the momentary baselines.

The max Dev is continuously computed during the learning period and during peace time, as a measurement for the actual legitimate deviation from the momentary baseline of the various traffic features. The max Dev is separately computed against the short-term and long-term baselines. Examples for computing the max Dev value are discussed above.

At S440, once the various traffic features' baselines are computed, the estimated traffic telemetries, or the momentary real-time traffic feature values, are compared to the baselines to determine whether an anomaly is present. Each traffic telemetry is established to its respective baselines (both short and long, or short or long separately). An anomaly is detected as a deviation from one of the short-term or long-term baselines. When using the maxDev as a baseline threshold, each sample is compared with baseline threshold $U(t)$. An alert is generated when samples exceed the threshold several times in a row, triggering an alarm.

In one embodiment, the anomaly may be computed as deviations from one of the two rate-base baselines as follows:

$$Y[t]>Y_{baseline}+\rho*\sigma$$

In an embodiment, where $Y[t]$ is the current sample, $Y_{baseline}$ is either the short-term or long-term baseline, $\sigma$ is the corresponding variance, and $\rho$ is a preconfigured parameter defining the sensitivity. An anomaly alarm is alerted only after configurable consecutive detections of such anomalies satisfying the above equation. In an embodiment, a predefined number (e.g., 5 or 10) of consecutive detections can be considered as an alarm.

At S450, based on the anomaly indications (detected anomalies), it is determined if any kind of QUIC DDoS attack is currently on-going. If so, execution continues with S460; otherwise, execution returns to S410. For each attack type, an attack is detected when an anomaly is measured on both the at least one rate-base traffic feature and the at least one rate-invariant traffic feature.

For example, a QUIC UDP floods attack is detected when an anomaly is detected in the number of long header packets per second feature and the average number of bytes feature. Any of the features noted above for detecting the QUIC UDP floods attack can be utilized.

At S460, upon detection of a QUIC DDoS attack, an execution of at least one mitigation action is triggered. In an embodiment, triggering a mitigation action at S460 may include providing instructions to a mitigator to execute a mitigation action. Such an action may include generating alerts, automatically finding the attack signatures and blocking further packets with such signatures, causing the client to perform a web challenge or a QUIC challenge, redirecting traffic to a scrubbing center, blocking traffic, limiting traffic rates, and so on, or a combination thereof. As mentioned above, the mitigation action may be selected based on the type of the detected attack.

Figure 5:
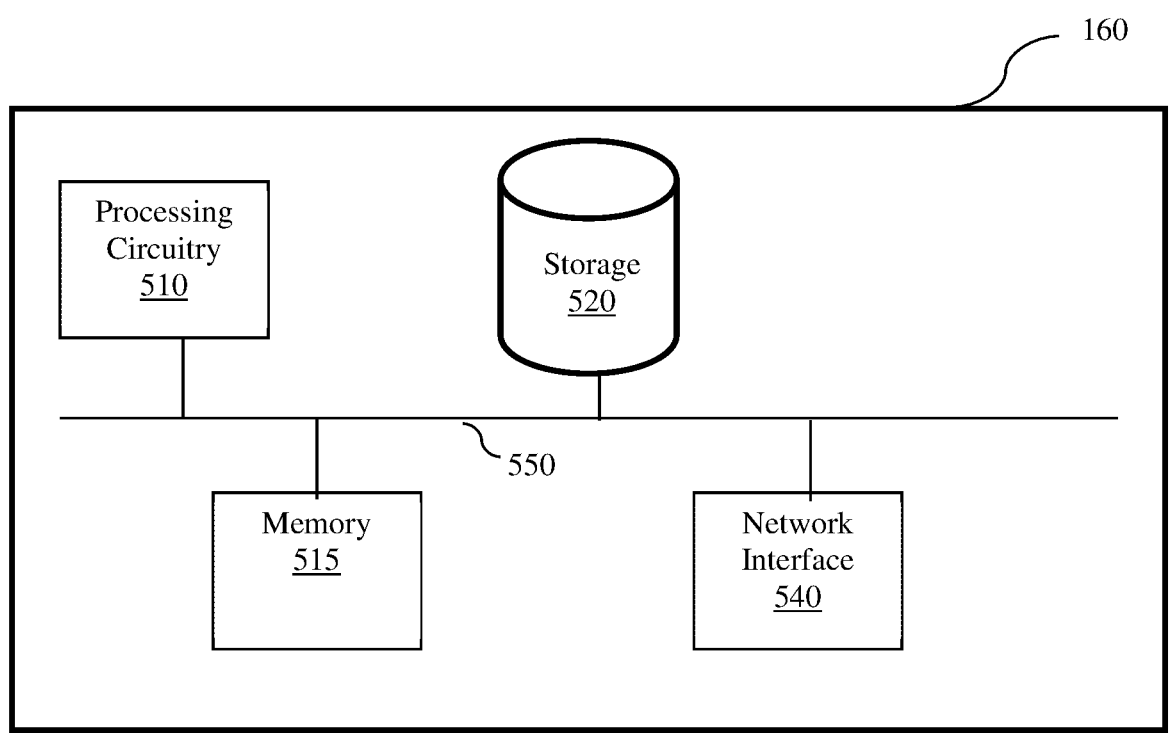
FIG. 5 is an example block diagram of the detector implemented according to an embodiment.

FIG. 5 is an example block diagram of the detector 160 implemented according to an embodiment. The detector 160 includes a processing circuitry 510 coupled to a memory 515, a storage 520, and a network interface 540. In another embodiment, the components of the detector 160 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform the embodiments described herein.

The storage 520 may be magnetic storage, optical storage, and the like, and may be realized, for example, as flash memory or other memory technology, CD-ROM, Digital Versatile Disks (DVDs), or any other medium which can be used to store the desired information. The storage 520 may include workflow schemes as described herein.

The processing circuitry 510 is configured to detect and cause mitigation of HTTPS flood attacks, and any encrypted DDoS attacks as described herein. The network interface 540 allows the detector 160 to communicate with the protected entities and the network 110 (FIG. 1).

It should be understood that the embodiments described herein are not limited to the specific architecture illustrated in FIG. 5, and other architectures may be equally used without departing from the scope of the disclosed embodiments. It should be further noted that the detector 170 may be structured according to architecture illustrated in FIG. 5.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform, such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

What is claimed is:

1. A method for protecting against quick user datagram protocol (UDP) Internet connection (QUIC) based denial-of-service (DoS) attacks, comprising:
   extracting traffic features from QUIC traffic directed to a protected entity, wherein the traffic features indicate behavior specifically of the QUIC traffic directed to the protected entity, wherein the extracted traffic features include at least one rate-based feature for the QUIC traffic and at least one rate-invariant feature for the QUIC traffic, and wherein the QUIC traffic is comprised of QUIC packets;
   computing at least one baseline for each respective one of the at least one rate-based feature for the QUIC traffic and the at least one rate-invariant feature for the QUIC traffic; and
   analyzing real-time samples of traffic directed to the protected entity subsequent to computing the at least one baseline for each respective one of the at least one rate-based feature and the at least one rate-invariant feature to detect a deviation from each respective one of the at least one computed baseline, wherein the deviation is indicative of a detected QUIC DoS attack; and
   causing execution of at least one mitigation action when an indication of the detected QUIC DoS attack is determined.

2. The method of claim 1, further comprising:
   extracting traffic features from traffic directed from the protected entity.

3. The method of claim 1, wherein extracting the traffic features further comprises:
   monitoring at least a UDP port at the protected entity to analyze the QUIC packets received through the UDP port to determine at least a type of each packet, wherein a packet type includes any one of: a QUIC short header packet, a QUIC long header packet, and a QUIC long header packet designated as an Initial Packet type.

4. The method of claim 1, wherein extracting at least one rate-based feature for the QUIC traffic further comprises any one of:
   counting a number of bytes and QUIC packets designated as short header packets received during a predefined time frame; and
   counting a number of bytes and QUIC packets designated as long header packets received during a predefined time frame; and
   counting a number of bytes and QUIC packets designated as long header packets of type Initial Packet received during a predefined time frame.

5. The method of claim 1, wherein extracting the traffic features further comprises:
   counting a number of bytes and QUIC packets designated as short header and QUIC packets designated as long header received at a UDP port; and
   dividing the number of the bytes and QUIC packets by a number of active ConnectionIDs.

6. The method of claim 1, wherein the at least one extracted rate-based feature and the at least one rate-invariant feature are determined based on a type of the QUIC DoS attack and required protection under the respective attack type, wherein the attack type is any of: QUIC UDP floods, QUIC HTTP floods, and QUIC connection floods, and wherein the required protection includes any one of: QUIC floods, QUIC Connection Initiation; and QUIC Connection Limit.

7. The method of claim 6, wherein the at least rate-based feature to provide the is QUIC floods protection includes a number of long header packets per second; a number of QUIC packets per second; and a number of QUIC bytes per second, and wherein at least one rate-invariant traffic feature to provide the QUIC floods protection includes an average QUIC packet size for both long and short header; a long header ratio; and a number of bytes and QUIC packets per active Connectionid for both long and short headers.

8. The method of claim 6, wherein the at least rate-based traffic feature to provide the QUIC Connection Initiation protection includes a number of long header packets per second; and a number of long header packets set as "Initial Packet" per second, and wherein the at least one rate-invariant feature to provide the QUIC Connection Initiation protection includes along header ratio.

9. The method of claim 6, wherein the at least rate-based traffic feature to provide the is QUIC Connection Limit protection includes a number of active ConnectionIDs per second; and a number of new active ConnectionIDs per second, and wherein the at least rate-invariant feature to provide the is QUIC Connection Limit protection includes an increase in an average number of bytes per active ConnectionID; and a decrease in an average number of bytes per active ConnectionID.

10. The method of claim 1, wherein analyzing real-time samples of traffic directed to the protected entity to detect a deviation further comprises:
    comparing real-time samples of the at least one rate-based feature and at least one rate-invariant feature to the at least one respective baseline; and
    detecting an anomaly when at least one of: the at least one rate-based feature and at least one rate-invariant feature deviates by a threshold from the at least one respective baseline.

11. The method of claim 10, wherein computing at least one baseline further comprises:
    computing a short-term baseline and a long-term baseline based on the real-time samples, wherein the short-term baseline is adapted to relatively rapid changes in the QUIC UDP traffic, and the long-term baseline is adapted to relatively slow changes in the QUIC UDP traffic.

12. The method of claim 11, wherein computing at least one baseline further comprises: factoring periods with no traffic followed by high bursts of traffic, wherein the traffic includes QUIC UDP packets.

13. The method of claim 10, wherein the threshold is dynamically updated as follows:

$$U(t)=Y(t)+\text{maxDev};$$

wherein U(t) is an anomaly threshold, Y(t) is a baseline, and maxDev is a maximum deviation of an observed traffic feature during peace time corresponding to a required value of a false positive detections rate of the observed traffic feature.

14. The method of claim 1, wherein causing the execution of at least one mitigation action occurs when at least one anomaly is detected on each of the at least one rate-based feature and the at least one rate-invariant feature.

15. The method of claim 1, wherein the mitigation action includes at least one of: a web challenge, a QUIC challenge, blocking traffic, rate limiting, attack signature generation, and generating alerts, wherein one or more mitigation actions can be executed in an escalated order.

16. The method of claim 1, wherein the method is performed by a defense system, wherein the defense system is deployed in-line with traffic between client devices accessing the protected entity, wherein the protected entity is deployed as at least one of: a QUIC enabled server and a non-QUIC enabled server and a network.

17. The method of claim 1, wherein the method is performed by a defense system, wherein the defense system is deployed out-of-path between client devices accessing the protected entity, wherein the protected entity is deployed as at least one of: a QUIC enabled server and a non-QUIC enabled server and a network.

18. The method of claim 1, wherein the method is performed by a defense system, wherein the defense system is installed in a cloud defense platform as an always-on deployment, wherein the cloud defense platform is deployed on a path between client devices and the protected entity.

19. A non-transitory computer readable medium having stored thereon instructions for causing a processing circuitry to execute the method of claim 1.

20. A system for protecting against quick user datagram protocol (UDP) Internet connection (QUIC) based denial-of-service (DoS) attacks, comprising, comprising:
    a processing circuitry; and
    a memory, the memory containing instructions that, when executed by the processing circuitry, configure the system to:
    extract traffic features from QUIC traffic directed to a protected entity, wherein the traffic features indicate behavior specifically of the QUIC traffic directed to the protected entity, wherein the extracted traffic features include at least one rate-based feature for the QUIC traffic and at least one rate-invariant feature for the QUIC traffic, and wherein the QUIC traffic is comprised of QUIC packets;
    compute at least one baseline for each respective one of the at least one rate-based feature for the QUIC traffic and the at least one rate-invariant feature for the QUIC traffic; and
    analyze real-time samples of traffic directed to the protected entity subsequent to computing the at least one baseline for each respective one of the at least one rate-based feature and the at least one rate-invariant feature to detect a deviation from each respective one of the at least one computed baseline, wherein the deviation is indicative of a detected QUIC DoS attack; and
    cause execution of at least one mitigation action when an indication of the detected QUIC DoS attack is determined.

21. The system of claim 20, wherein the system is further configured to:
    extract traffic features from traffic directed from the protected entity.

22. The system of claim 20, wherein the system is further configured to:
    monitor at least a UDP port at the protected entity to analyze the QUIC packets received through the UDP port to determine at least a type of each packet, wherein a packet type includes any one of: a QUIC short header packet, a QUIC long header packet, and a QUIC long header packet designated as an Initial Packet type.

23. The system of claim 20, wherein to extract at least one rate-based feature for the QUIC traffic the system is further configured to perform any one of:
    count a number of bytes and QUIC packets designated as short header packets received during a predefined time frame; and
    count a number of bytes and QUIC packets designated as long header packets received during a predefined time frame; and
    count a number of bytes and QUIC packets designated as long header packets of type Initial Packet received during a predefined time frame.

24. The system of claim 20, wherein the system is further configured to:
    count a number of bytes and QUIC packets designated as short header and QUIC packets designated as long header received at a UDP port; and
    divide the number of the bytes and QUIC packets by a number of active Connection IDs.

25. The system of claim 20, wherein the at least one extracted rate-based feature and the at least one rate-invariant feature are determined based on a type of the QUIC DoS attack, and required protection under the respective attack type, wherein the attack type is any of: QUIC UDP floods, QUIC HTTP floods, and QUIC connection floods, and wherein the required protection includes any one of: QUIC floods, QUIC Connection Initiation; and QUIC Connection Limit.

26. The system of claim 25, wherein the at least rate-based feature to provide the is QUIC floods protection includes a number of long header packets per second; a number of QUIC packets per second; and a number of QUIC bytes per second, and wherein at least one rate-invariant traffic feature to provide the is QUIC floods protection includes an average QUIC packet size for both long and short header; a long header ratio; and a number of packets per active Connectionid for both long and short headers.

27. The system of claim 25, wherein the at least rate-based feature to provide the QUIC Connection Initiation protection includes a number of long header packets per second; and a number of long header packets set as "Initial Packet" per second, and wherein the at least one rate-invariant feature to provide the QUIC Connection Initiation protection includes along header ratio.

28. The system of claim 25, wherein the at least rate-based feature to provide the is QUIC Connection Limit protection includes a number of active ConnectionIDs per second; and a number of new active ConnectionIDs per second, and wherein the at least rate-invariant feature to provide the is QUIC Connection Limit protection includes an increase in an average number of bytes per active ConnectionID; and a decrease in an average number of bytes per active ConnectionID.

29. The system of claim 25, wherein the system is further configured to:
    compare real-time samples of the at least one rate-based feature and at least one rate-invariant feature to the at least one respective baseline; and
    detect an anomaly when at least one of: the at least one rate-based feature and at least one rate-invariant feature deviates by a threshold from the at least one respective baseline.

30. The system of claim 25, wherein the system is further configured to:
    compute a short-term baseline and a long-term baseline based on the real-time samples, wherein the short-term baseline is adapted to relatively rapid changes in the QUIC UDP traffic, and the long-term baseline is adapted to relatively slow changes in the QUIC UDP traffic.

31. The system of claim 24, wherein the threshold is dynamically updated as follows:

$U(t)=Y(t)+\text{maxDev}$;

wherein U(t) is an anomaly threshold, Y(t) is a baseline, and maxDev is a maximum deviation of an observed traffic feature during peace time corresponding to a required value of a false positive detections rate of the observed traffic feature.

32. The system of claim 20, wherein the system is further configured to:
cause the execution of at least one mitigation action occurs when at least one anomaly is detected on each of the at least one rate-based feature and the at least one rate-invariant feature.

33. The system of claim 20, wherein the mitigation action includes at least one of: a web challenge, a QUIC challenge, blocking traffic, rate limiting, attack signature generation, and generating alerts, wherein one or more mitigation actions can be executed in an escalated order.

34. The system of claim 20, wherein the system is deployed in-line with traffic between client devices accessing the protected entity, wherein the protected entity is deployed as at least one of: a QUIC enabled server and a non-QUIC enabled server and a network.

35. The system of claim 20, wherein the system is deployed out-of-path between client devices accessing the protected entity, wherein the protected entity is deployed as at least one of: a QUIC enabled server and a non-QUIC enabled server and a network.

36. The system of claim 20, wherein the system is installed in a cloud defense platform as an always-on deployment, wherein the cloud defense platform is deployed on a path between client devices and the protected entity.

37. The system of claim 25, wherein the system is further configured to:
factor periods with no traffic followed by high bursts of traffic, wherein the traffic includes QUIC UDP packets.

38. A method for protecting against quick user datagram protocol (UDP) Internet connection (QUIC) based denial-of-service (DoS) attacks, comprising:
extracting at least one rate-based feature from at least traffic directed to a protected entity, wherein the at least one rate-based feature indicates behavior specifically of the QUIC traffic directed to the protected entity, and wherein the QUIC traffic is comprised of QUIC packets;
computing at least one baseline for each of the at least one rate-based feature for the QUIC traffic;
analyzing real-time samples of traffic directed to the protected entity subsequent to computing the at least one baseline to detect a deviation from each of the at least one computed baseline, wherein the deviation is indicative of a detected QUIC DoS attack; and
causing execution of at least one mitigation action when an indication of the detected QUIC DoS attack is determined.

39. The method of claim 38, wherein extracting the at least one rate-based feature further comprises:
counting a number of QUIC packets designated as short header packets received during a predefined time frame; and
counting a number of packets designated as long header packets received during a predefined time frame; and
counting a number of packets designated as long header packets of type Initial Packet received during a predefined time frame.

40. The method of claim 38, wherein the at least one extracted rate-based feature is determined based on a type of the QUIC DoS attack and required protection under the respective attack type, wherein the attack type is any of: QUIC UDP floods, QUIC HTTP floods, and QUIC connection floods, and wherein the required protection includes any one of: QUIC floods, QUIC Connection Initiation; and QUIC Connection Limit.

41. The method of claim 40, wherein the at least rate-based feature to provide the is QUIC floods protection includes a number of long header packets per second; a number of QUIC packets per second; and a number of QUIC bytes per second.

42. The method of claim 40, wherein the at least rate-based feature to provide the QUIC Connection Initiation protection includes a number of long header packets per second; and a number of long header packets set as "Initial Packet" per second.

43. The method of claim 40, wherein the at least rate-based feature to provide the QUIC Connection Initiation protection includes a number of active ConnectionlDs per second; and a number of new active ConnectionlDs per second.

44. A non-transitory computer readable medium having stored thereon instructions for causing a processing circuitry to execute the method of claim 38.

45. A system for protecting against quick user datagram protocol (UDP) Internet connection (QUIC) based denial-of-service (DoS) attacks, comprising: a processing circuitry; and a memory, the memory containing instructions that, when executed by the processing circuitry, configure the system to execute the method of claim 38.

* * * * *